United States Patent
Ahn et al.

(10) Patent No.: US 10,462,377 B2
(45) Date of Patent: Oct. 29, 2019

(54) SINGLE-APERTURE MULTI-SENSOR LENSLESS COMPRESSIVE IMAGE ACQUISITION

(71) Applicants: Jong-Hoon Ahn, Bedminster, NJ (US); Hong Jiang, Warren, NJ (US)

(72) Inventors: Jong-Hoon Ahn, Bedminster, NJ (US); Hong Jiang, Warren, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 77 days.

(21) Appl. No.: 15/224,042

(22) Filed: Jul. 29, 2016

(65) Prior Publication Data

US 2018/0035036 A1    Feb. 1, 2018

(51) Int. Cl.
| | |
|---|---|
| H04N 5/235 | (2006.01) |
| H04N 5/369 | (2011.01) |
| H04N 5/378 | (2011.01) |
| H04N 5/225 | (2006.01) |
| H04N 5/232 | (2006.01) |
| G03B 41/00 | (2006.01) |
| G03B 7/00 | (2014.01) |

(52) U.S. Cl.
CPC ........... *H04N 5/2353* (2013.01); *G03B 41/00* (2013.01); *H04N 5/2254* (2013.01); *H04N 5/2258* (2013.01); *H04N 5/23238* (2013.01); *H04N 5/3696* (2013.01); *H04N 5/378* (2013.01); *G02B 2207/129* (2013.01); *G03B 7/003* (2013.01)

(58) Field of Classification Search
CPC ...... H04N 5/2254; H04N 5/235; H04N 5/238; H04N 5/3696

USPC ......................................................... 348/340
See application file for complete search history.

(56) References Cited

U.S. PATENT DOCUMENTS

| | | | |
|---|---|---|---|
| 6,765,617 | B1 | 7/2004 | Tangen |
| 9,438,814 | B2 * | 9/2016 | Hjelmstrom ......... H04N 5/2351 |
| | | | (Continued) |

FOREIGN PATENT DOCUMENTS

| | | | | |
|---|---|---|---|---|
| EP | 2 685 707 A1 | 1/2014 | | |
| EP | 3021571 A1 * | 5/2016 | ....... | H01L 27/14612 |

OTHER PUBLICATIONS

International Search Report and Written Opinion for corresponding International Application No. PCT/US2017/042309, dated Oct. 9, 2017, 12 pages.

(Continued)

*Primary Examiner* — Anthony J Daniels
(74) *Attorney, Agent, or Firm* — Tong, Rea, Bentley & Kim, LLC

(57) ABSTRACT

The present disclosure generally discloses single-aperture multi-sensor lensless compressive image acquisition capabilities. The present disclosure generally discloses a single-aperture multi-sensor lensless camera including a programmable aperture and a set of sensors. The programmable aperture is configured to modulate an amount of light permitted to pass through the programmable aperture and has a shape defined based on a set of vertices of the programmable aperture. The sensors are arranged, with respect to each other, based on the vertices of the programmable aperture. The sensors may be arranged such that respective reference lines, between the respective vertices of the programmable aperture and the respective sensors, are parallel or substantially parallel.

17 Claims, 15 Drawing Sheets

(56) References Cited

U.S. PATENT DOCUMENTS

| | | | |
|---|---|---|---|
| 9,749,532 B1* | 8/2017 | Hinkel | G02B 27/646 |
| 2006/0006486 A1 | 1/2006 | Seo | |
| 2008/0007645 A1* | 1/2008 | McCutchen | H04N 5/238 |
| | | | 348/360 |
| 2008/0124070 A1* | 5/2008 | Liang | G03B 9/04 |
| | | | 396/435 |
| 2008/0316323 A1 | 12/2008 | Morita | |
| 2010/0225755 A1 | 9/2010 | Tamaki | |
| 2012/0038786 A1 | 2/2012 | Kelly et al. | |
| 2013/0201297 A1 | 8/2013 | Jiang et al. | |
| 2013/0201343 A1 | 8/2013 | Jiang et al. | |
| 2015/0003750 A1* | 1/2015 | Bernal | G06T 11/006 |
| | | | 382/233 |
| 2015/0163387 A1* | 6/2015 | Lee | H04N 5/238 |
| | | | 349/2 |
| 2015/0382000 A1 | 12/2015 | Jiang et al. | |
| 2015/0382026 A1 | 12/2015 | Jiang et al. | |
| 2016/0006916 A1 | 1/2016 | Jiang et al. | |
| 2016/0021390 A1 | 1/2016 | Haimi-Cohen | |

OTHER PUBLICATIONS

Huang et al., "Lensless Compressive Sensing Imaging," ftp://ftp.math.ucla.edu/pub/camreport/cam13-09.pdf, XP05410700, Feb. 7, 2013, pp. 1-12.

Jiang, H. et al., "Multi-View in Lensless Compressive Imaging," Cambridge Core, SIP 2014, vol. 3, e15, downloaded from https://www.cambridge.org/core/services/aop-cambridge-core/content/view/S204877031400016X on Jan. 26, 2017, pp. 1-10.

MIT Technology Review, "Bell Labs Invents Lensless Camera," A view from Emerging Technology from the arXiv, downloaded from https://www.technologyreview.com/s/515651/bell-labs-invents-lensless-camera/ on Jan. 24, 2017, pp. 1-6.

Yuan X. et al., "Lensless Compressive Imaging," arXiv, downloaded from https://arxiv.org/pdf/1508.03498.pdf on Jan. 24, 2017, pp. 1-37.

\* cited by examiner

FIG. 1
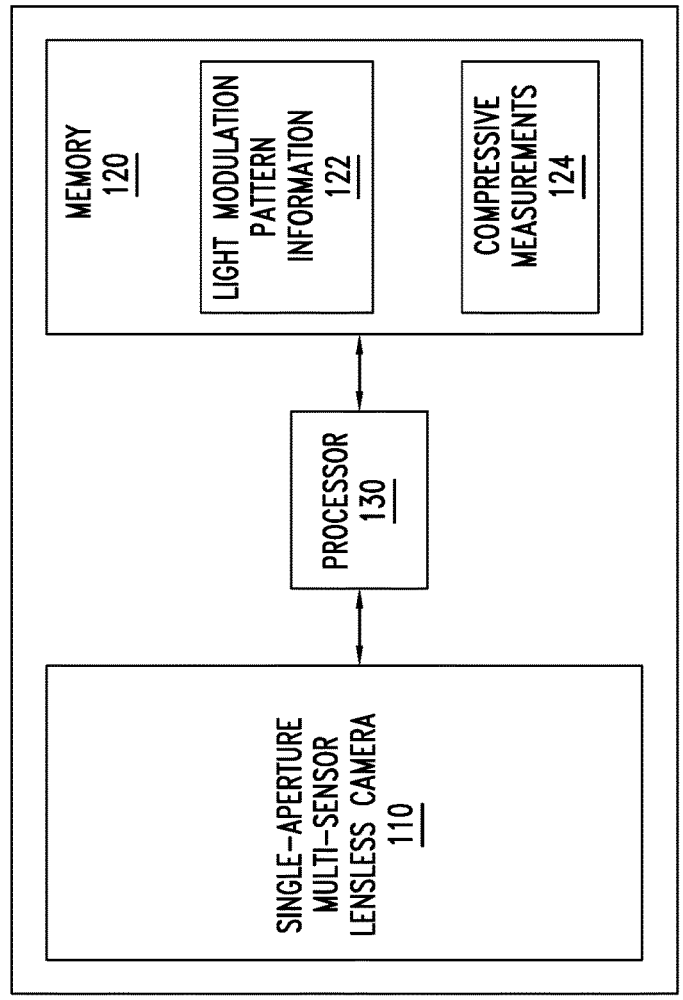
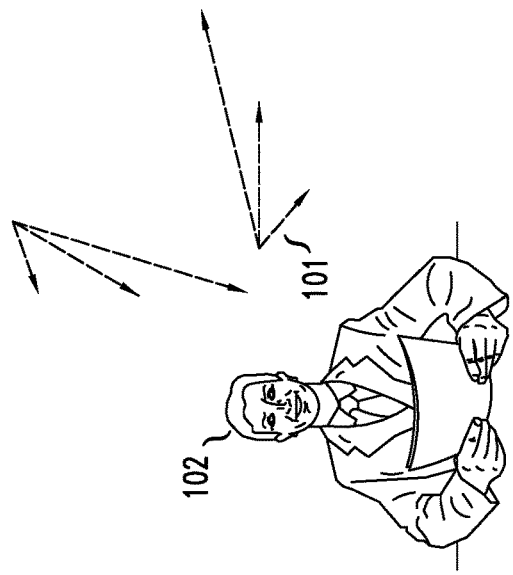

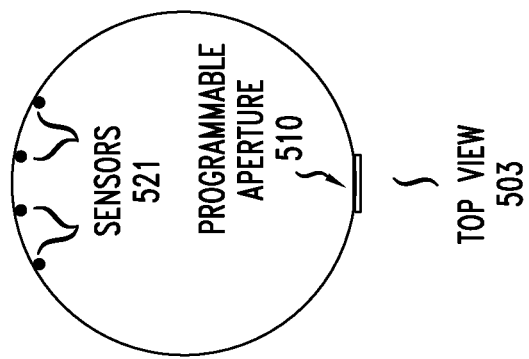
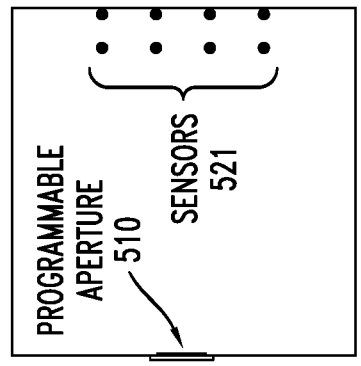
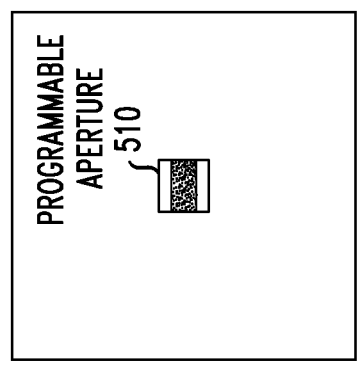

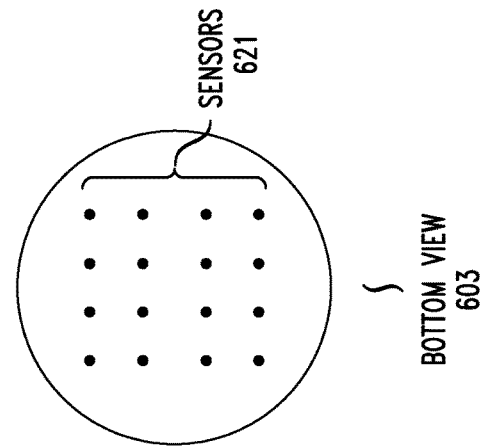
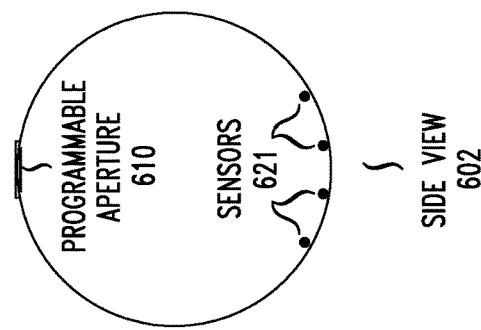
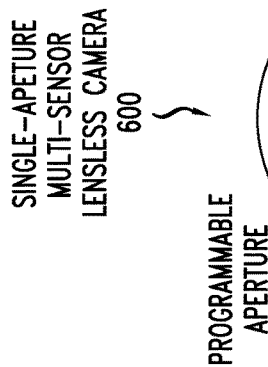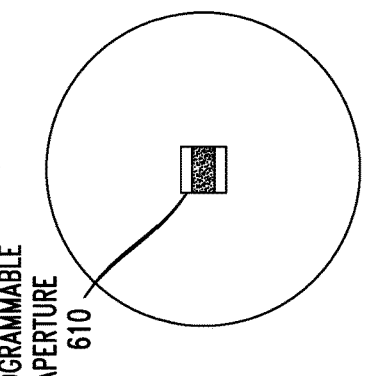

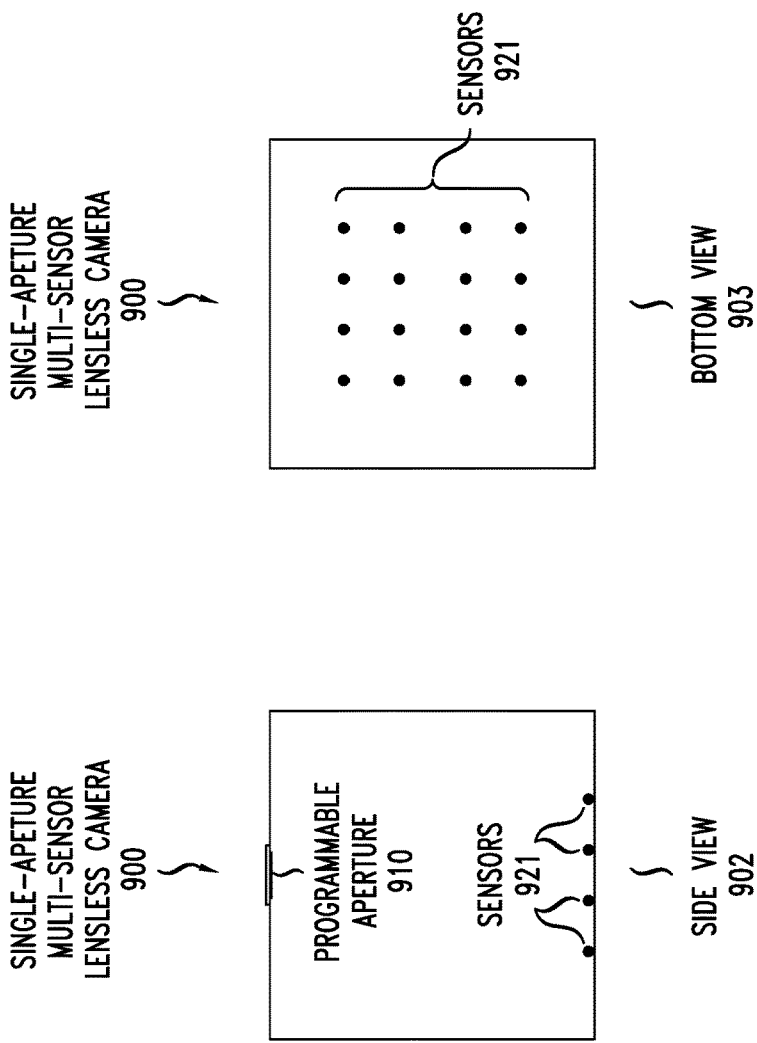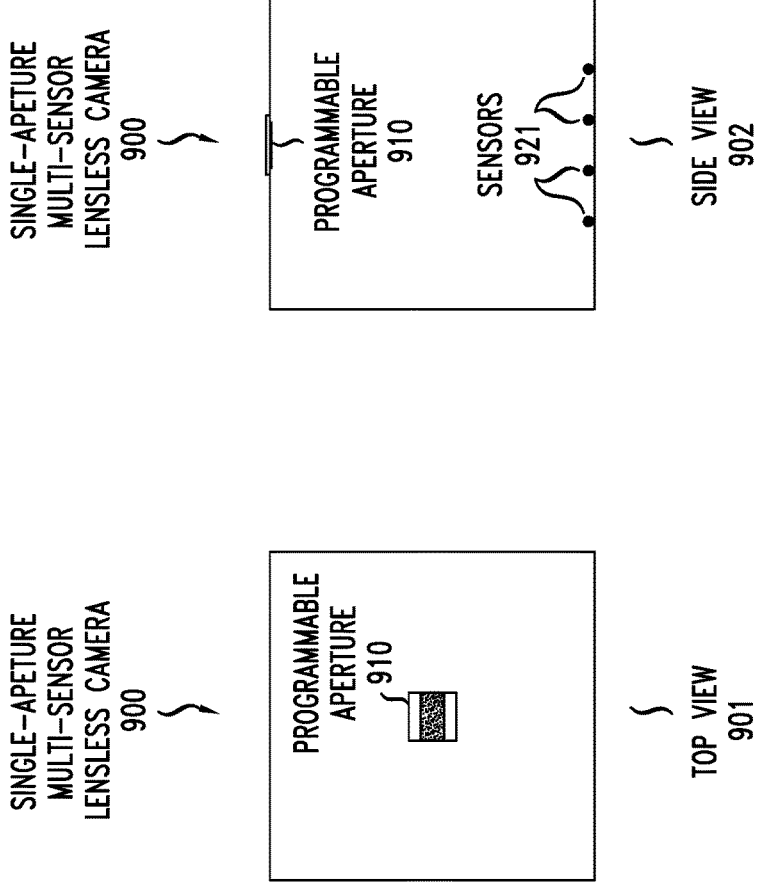

SINGLE-APERTURE MULTI-SENSOR LENSLESS COMPRESSIVE IMAGE ACQUISITION

TECHNICAL FIELD

The present disclosure relates generally to image acquisition and, more particularly but not exclusively, to lensless compressive image acquisition.

BACKGROUND

Image acquisition, as performed by contemporary digital image or video systems, generally involves the acquisition and immediate compression of large amounts of raw image or video data. This typically requires use of a large numbers of sensors and a large amount of data storage.

SUMMARY

The present disclosure generally discloses single-aperture multi-sensor lensless compressive image acquisition capabilities.

In at least some embodiments, an apparatus includes a programmable aperture and a set of sensors. The programmable aperture is configured to modulate passage of light therethrough. The programmable aperture has a shape defined based on a set of vertices. The sensors are arranged, with respect to each other, based on the vertices of the programmable aperture.

In at least some embodiments, an apparatus includes a set of sensors. The sensors are arranged, with respect to each other, based on respective vertices defining a shape of a programmable aperture configured to control incidence of light on the sensors.

In at least some embodiments, an apparatus includes a programmable aperture, a set of sensors, and a processor. The programmable aperture is configured to modulate passage of light therethrough. The programmable aperture has a shape defined based on a set of vertices. The sensors are arranged, with respect to each other, based on the vertices of the programmable aperture. The processor is configured to receive image data produced by the sensors and to generate an image based on the image data.

BRIEF DESCRIPTION OF THE DRAWINGS

The teachings herein can be readily understood by considering the following detailed description in conjunction with the accompanying drawings, in which:

FIG. 1 depicts an exemplary single-aperture multi-sensor lensless compressive image acquisition system;

FIGS. 5A-5C depict front, side and top views of an exemplary single-aperture multi-sensor lensless camera having a cylindrical arrangement of sensors;

FIGS. 6A-6C depict top, side, and bottom views of an exemplary single-aperture multi-sensor lensless camera having a spherical arrangement of sensors;

FIGS. 9A-9C depict top, side, and bottom views of an exemplary single-aperture multi-sensor lensless camera having a planar arrangement of sensors;

To facilitate understanding, identical reference numerals have been used, where possible, to designate identical elements that are common to the figures.

DETAILED DESCRIPTION

Figure 2:
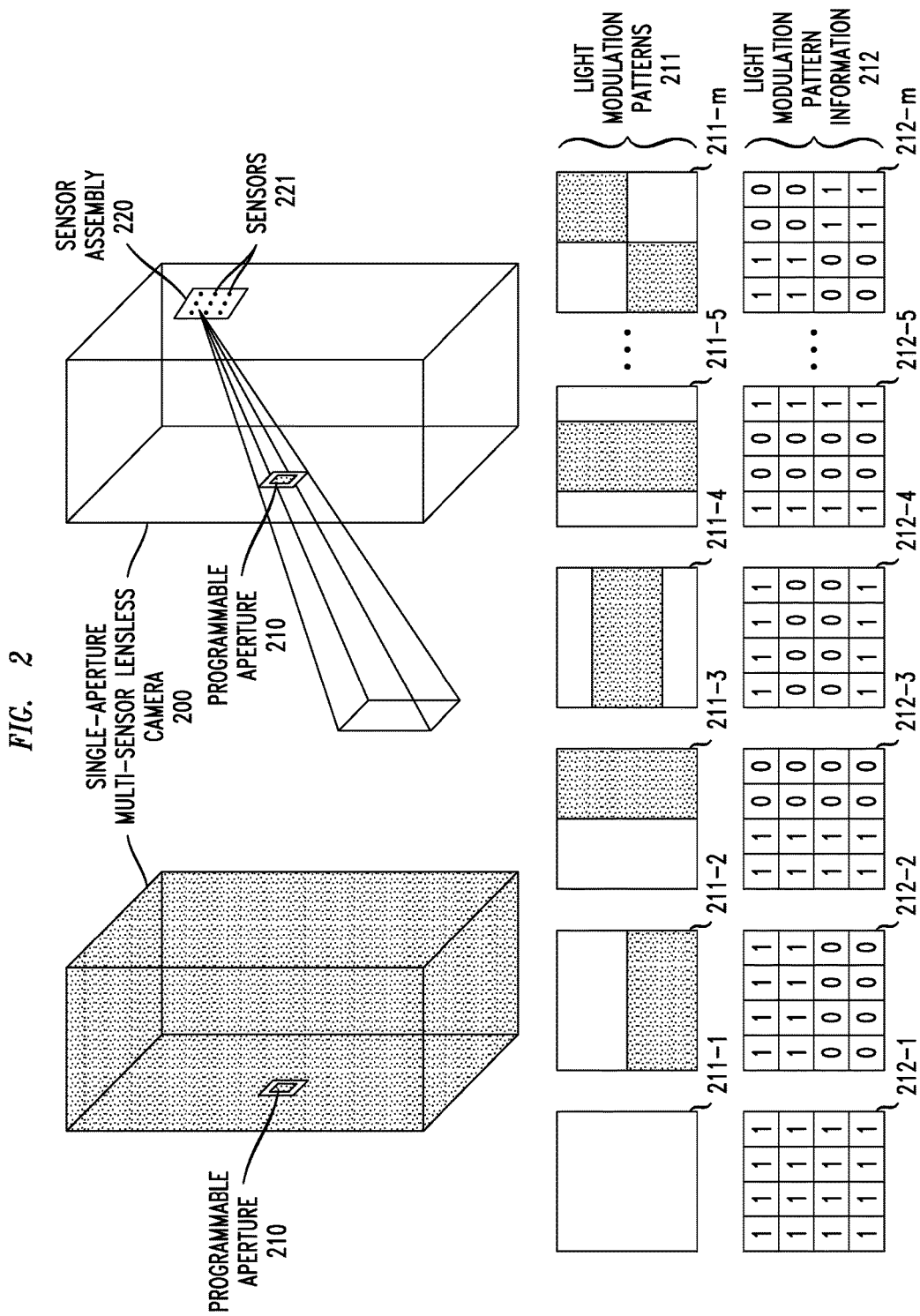
FIG. 2 depicts an exemplary single-aperture multi-sensor lensless camera for use in the multi-sensor lensless compressive image acquisition system of FIG. 1.

The present disclosure generally discloses single-aperture multi-sensor lensless compressive image acquisition capabilities. The single-aperture multi-sensor lensless compressive image acquisition capabilities may include a single-aperture multi-sensor lensless camera. The single-aperture multi-sensor lensless camera may include a programmable aperture and a set of sensors. The programmable aperture is configured to modulate the passage of light through the programmable aperture and, thus, to control incidence of light on the sensors. The programmable aperture has a shape defined based on a set of vertices. The sensors are configured to detect light passing through the programmable aperture and to produce image data (e.g., detector output data, compressive measurements, or the like) which may be processed to reconstruct an image. The sensors are arranged, with respect to each other, based on the vertices of the programmable aperture. The sensors may be arranged, with respect to each other, based on the arrangement of the vertices of the programmable aperture with respect to each other (and, thus, based on the shape and size of the programmable aperture). The sensors may be arranged such that respective reference lines, between the respective vertices of the programmable aperture and the respective sensors, are parallel or substantially parallel. The sensors may be arranged such that, for adjacent ones of the sensors, respective reference lines between the respective vertices of the programmable aperture and the respective adjacent ones of the sensors, are parallel or substantially parallel. The sensors may be arranged, with respect to each other based on the vertices of the programmable aperture, in a cylindrical arrangement, a spherical arrangement, a planar arrangement, a non-uniform arrangement, or the like. It will be appreciated that these and various other embodiments and potential advantages of single-aperture multi-sensor lensless compressive image acquisition capabilities may be further understood by way of reference to the exemplary lensless compressive image acquisition system of FIG. 1.

FIG. 1 depicts an exemplary single-aperture multi-sensor lensless compressive image acquisition system.

As depicted in FIG. 1, incident light 101 reflecting from an object 102 is received by a single-aperture multi-sensor lensless compressive image acquisition system 100 that is configured to perform compressive image acquisition to capture an image including the object 102.

The single-aperture multi-sensor lensless compressive image acquisition system 100 includes a single-aperture multi-sensor lensless camera 110, a memory 120, and a processor 130. The processor 130 is communicatively connected to the single-aperture multi-sensor lensless camera 110 and the memory 120.

The single-aperture multi-sensor lensless camera 110 is configured to perform compressive sampling for compressive image acquisition. An exemplary single-aperture multi-sensor lensless camera 110 is depicted and described with respect to FIG. 2. It will be appreciated that, although primarily presented with respect to embodiments in which single-aperture multi-sensor lensless camera 110 produces compressive measurements for compressive image acquisition, in at least some embodiments the compressive measurements for compressive image acquisition may be produced by an element other than single-aperture multi-sensor lensless camera 110 (e.g., processor 130 or a remote element) based on detector output data produced by single-aperture multi-sensor lensless camera 110 (e.g., detector output data produced by detectors of single-aperture multi-sensor lensless camera 110).

The memory 120 is configured to store information associated with single-aperture multi-sensor lensless compressive image acquisition. The memory 120 is configured to store light modulation pattern information 122 (which also may be referred to herein as measurement basis information) for use by the single-aperture multi-sensor lensless camera 110 in performing compressive sampling for compressive image acquisition. The memory 120 is configured to store compressive measurements 124 that are produced by the single-aperture multi-sensor lensless camera 110 while performing compressive sampling for compressive image acquisition. The memory 120 may be configured to store various other types of information (e.g., control processes for controlling image acquisition, data processing processes for controlling processing of data for image reconstruction, other types of input or output data, or the like, as well as various combinations thereof).

The processor 130 is configured to control the operation of single-aperture multi-sensor lensless camera 110 to perform compressive sampling for compressive image acquisition. The processor 130 may be configured to provide the light modulation pattern information 122 to the single-aperture multi-sensor lensless camera 110 for use by the single-aperture multi-sensor lensless camera 110 in performing compressive sampling for compressive image acquisition. The processor 130 may be configured to receive the compressive measurements 124 produced by the multi-sensor lensless camera 110 while performing compressive sampling and to control storage of the compressive measurements 124 produced by the multi-sensor lensless camera 110 in the memory 120. The processor 130 also may be configured to provide additional processing functions related to lensless compressive image acquisition by single-aperture multi-sensor lensless camera 110, such as performing image reconstruction processing in order to reconstruct the image captured by single-aperture multi-sensor lensless camera 110 based on compressive sampling for compressive image acquisition.

It will be appreciated that single-aperture multi-sensor lensless compressive image acquisition system 100 may be provided within various contexts. For example, single-aperture multi-sensor lensless compressive image acquisition system 100 may form part of a photographic camera, a video camera, a smartphone, a tablet computer, an Internet-of-Things (IoT) device, or the like.

It will be appreciated that, although primarily presented with respect to an embodiment in which the functions of the single-aperture multi-sensor lensless camera 110, the memory 120, and the processor 130 are integrated into a single device or system (illustratively, the single-aperture multi-sensor lensless compressive image acquisition system 100), various functions of the single-aperture multi-sensor lensless camera 110, the memory 120, and the processor 130 may be separated into multiple devices or systems which may be geographically centralized or distributed.

FIG. 2 depicts an exemplary single-aperture multi-sensor lensless camera for use in the single-aperture multi-sensor lensless compressive image acquisition system of FIG. 1.

The single-aperture multi-sensor lensless camera 200 includes a programmable aperture 210 and a sensor assembly 220.

The programmable aperture 210 is configured to modulate the passage of light through the programmable aperture 210. The programmable aperture 210 is configured to modulate the amount of light permitted to pass through the programmable aperture 210 and the pattern of light permitted to pass through the programmable aperture 210. The programmable aperture 210 has a fixed aperture size that is larger than a pinhole, but may be relatively small. The programmable aperture 210 has a shape that is defined based on a set of vertices. The shape of the programmable aperture 210 may be a shape that is repeatable without gaps. For example, the shape of the programmable aperture 210 may be a square, a rectangle, a rhombus, a parallelogram, or the like. The programmable aperture 210 may be configured to allow the view to be tessellated by translating an identical polygon without gaps while allowing negligible overlapping regions. The programmable aperture 210 has a size, which may depend on various factors (e.g., the distance between the programmable aperture 210 and the sensor assembly 220, the inter-sensor distance between sensors of the sensor assembly 220, or the like, as well as various combinations thereof). The programmable aperture 210 also may be referred to herein as a programmable mask.

The programmable aperture 210 includes an array of programmable elements. The programmable elements of programmable aperture 210 are configured to be individually controlled to permit light to pass therethrough or to prevent light from passing therethrough. The transmittance of each of the programmable elements can be programmable to be a specific value. The transmittance of each of the programmable elements can be programmable to be a specific value using light modulation pattern information. For example, the light modulation pattern information may be in the form of a matrix (or other suitable data structure) having a set of entries corresponding to the programmable elements of the programmable aperture 210, respectively. The entries of the matrix may support binary values, such as where each entry may have a value of 0 (e.g., no transmittance of light through the respective programmable element) or a value of 1 (e.g., full transmittance of light through the respective programmable element). The entries of the matrix may support a range of values (e.g., between 0 and 1, or between any other suitable range of values), such that the value of a given entry is indicative of the amount of transmittance of the programmable element associated with the given entry (e.g., intermediate values give some, but not full, transmittance of light). It will be appreciated that other values may be used to control the programmable elements of programmable aperture 210. The programmable elements of programmable aperture 210 may be controlled electrically (e.g., under the control of a processor or other control element), mechanically (e.g., using a digital micromirror device (DMD) or other suitable device), or the like, as well as various combinations thereof. For example, the programmable aperture 210 may be a transparent liquid crystal display (LCD) device having programmable LCD elements, a transparent liquid crystal on silicon (LCoS) device having programmable LCoS elements, or the like.

The programmable aperture 210, as noted above, includes an array of programmable elements configured to be individually controlled, to permit light to pass therethrough or to prevent light from passing therethrough, based on light modulation pattern information. It is noted that exemplary light modulation patterns 211 produced based on exemplary light modulation pattern information 212 are depicted in FIG. 2. In this example, the programmable aperture 210 is assumed to have sixteen equal-sized, square programmable elements (primarily discussed in an order of top-left to bottom-right proceeding by rows then columns), although it will be appreciated that fewer or more programmable elements may be present, programmable elements may have different shapes, programmable elements may have different sizes, or the like, as well as various combinations thereof. In the first exemplary light modulation pattern 211-1, the entire programmable aperture 210 is modulated to allow light to pass therethrough (illustratively, associated light modulation pattern information 212-1 may be an array of [1, 1, 1, 1, 1, 1, 1, 1, 1, 1, 1, 1, 1, 1, 1, 1]). In the second exemplary light modulation pattern 211-2, the top half of the programmable aperture 210 is modulated to allow light to pass therethrough and the bottom half of the programmable aperture 210 is modulated to prevent light from passing therethrough (associated light modulation pattern information 212-2 may be an array of [1, 1, 1, 1, 1, 1, 1, 1, 0, 0, 0, 0, 0, 0, 0, 0,]). In the third exemplary light modulation pattern 211-3, the left half of the programmable aperture 210 is modulated to allow light to pass therethrough and the right half of the programmable aperture 210 is modulated to prevent light from passing therethrough (illustratively, associated light modulation pattern information 212-3 may be an array of [1, 1, 0, 0, 1, 1, 0, 0, 1, 1, 0, 0, 1, 1, 0, 0]). In the fourth exemplary light modulation pattern 211-4, top and bottom quarters of the programmable aperture 210 are modulated to allow light to pass therethrough and the middle half of the programmable aperture 210 is modulated to allow light to prevent light from passing therethrough (illustratively, associated light modulation pattern information 212-4 may be an array of [1, 1, 1, 1, 0, 0, 0, 0, 0, 0, 0, 0, 1, 1, 1, 1]). In the fifth exemplary light modulation pattern 211-5, the left and right halves of the programmable aperture 210 are modulated to allow light to pass therethrough and the middle half of the programmable aperture 210 is modulated to prevent light from passing therethrough (illustratively, associated light modulation pattern information 212-5 may be an array of [1, 0, 0, 1, 1, 0, 0, 1, 1, 0, 0, 1, 1, 0, 0, 1]). In the m-th exemplary light modulation pattern 211-m, top-left and bottom-right quarters of the programmable aperture 210 are modulated to allow light to pass therethrough and bottom-left and top-right quarters of the programmable aperture 210 are modulated to prevent light from passing therethrough (illustratively, associated light modulation pattern information 212-m may be an array of [1, 1, 0, 0, 1, 1, 0, 0, 0, 0, 1, 1, 0, 0, 1, 1]). It will be appreciated that exemplary light modulation patterns 211 represent merely a few of the light modulation patterns which may be applied to the programmable aperture 210 to modulate passage of light through the programmable aperture 210. It will be appreciated that fewer or more sets of light modulation pattern information 212 may be supported and, thus, that fewer or more light modulation patterns 211 may be produced. The m sets of light modulation pattern information 212 may be used to produce m sets of compressive measurements as discussed further below within respect to sensor assembly 220.

The sensor assembly 220 includes a plurality of sensors 221. The sensors 221 are each configured to detect light passing through the programmable aperture 210 and to produce compressive measurements based on the detection of the light passing through the programmable aperture 210.

The sensors 221 of sensor assembly 210 are each configured to detect light passing through the programmable aperture 210 and to produce compressive measurements based on the detection of the light passing through the programmable aperture 210. The sensors 221 may each include (1) a detector that is configured to detect light and to produce a detector output based on the detected light and (2) a compressive measurement device configured to produce a compressive measurement based on the detector output of the detector. For example, the detector may be a photon detector and the compressive measurement device may be an analog-to-digital (A/D) converter configured to produce discretized compressive measurements based on the detector output. In general, a sensor 221 is configured to produce a compressive measurement based on detection of light passing through programmable aperture 210 and incident on the sensor based on use of light modulation pattern information, respectively. As such, given m sets of light modulation pattern information 212 configured to produce m light modulation patterns 211, each sensor 221 will produce m compressive measurements, respectively. Similarly, but stated differently, for a sensor assembly 220 that includes s number of sensors, use of each set of light modulation pattern information 212-x that is configured to produce a corresponding light modulation pattern 211-x will produces compressive measurements associated with the s sensors, respectively. Accordingly, for a sensor assembly 220 that includes s number of sensors, the use of the m sets of light modulation pattern information 212 that are configured to produce the m light modulation patterns 211 will result in a total of s×m total compressive measurements which may be processed to reconstruct the image captured by the single-aperture multi-sensor lensless camera 200. It will be appreciated that, although primarily presented with respect to embodiments in which the sensors 221 produce compressive measurements for compressive image acquisition, in at least some embodiments the compressive measurements for compressive image acquisition may be produced by an element other than sensors 221 (e.g., a processor or other controller which receives the detector outputs from the sensors 221 where the sensors 221 include photon detectors but do not include compressive measurement devices such as A/D converters).

The sensors 221 of sensor assembly 220 may be arranged in various ways. The sensors 221 may be arranged, with respect to each other, based on the vertices of the programmable aperture 210. The sensors 221 may be arranged such that a set of reference lines, between vertices of the programmable aperture 210 and adjacent sensors 221 of the sensor assembly, respectively, are parallel or substantially parallel. It is noted that this parallelism or substantial parallelism may be achieved with various arrangements of sensors 221. For example, sensors 221 may be arranged in a cylindrical arrangement (depicted and described with respect to FIGS. 3A-3F, FIG. 4, and FIGS. 5A-5C), a spherical arrangement (depicted and described with respect to FIGS. 3A-3F, FIG. 4, and FIGS. 6A-6C), a planar arrangement (depicted and described with respect to FIGS. 7A-7C, FIG. 8, and FIGS. 9A-9C), or other arrangements (e.g., a non-uniform arrangement as depicted and described with respect to FIG. 10). The parallelism or substantial parallelism of the vertices of the programmable aperture 210 may be further understood by way of reference to FIG. 4 (for a cylindrical or spherical arrangement of sensors 221), FIG. 8 (for a planar arrangement of sensors 221), and FIG. 12 (in which it is discussed more generally).

FIGS. 3A-3F depict two-dimensional cross sectional views of an exemplary multi-sensor lensless camera having a cylindrical or spherical arrangement of sensors. FIGS. 3A-3F illustrate transformation of independent use of multiple apertures and multiple sensors into a single-aperture multi-sensor lensless camera.

Figure 3A:
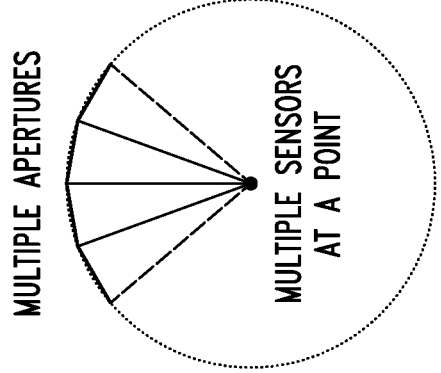
FIGS. 3A-3F depict two-dimensional cross sectional views of an exemplary multi-sensor lensless camera having a cylindrical or spherical arrangement of sensors.

FIG. 3A depicts a desired configuration in which multiple separated apertures direct light onto multiple sensors which are all located at a single point. This represents the independent use of multiple apertures and multiple sensors. By running aperture patterns independently and letting sensors sense each view, this desired configuration can take measurements quickly. However, while such an arrangement of apertures and sensors is desirable, this arrangement of apertures and sensors is not realistic since multiple sensors cannot physically occupy the same location.

Figure 3B:
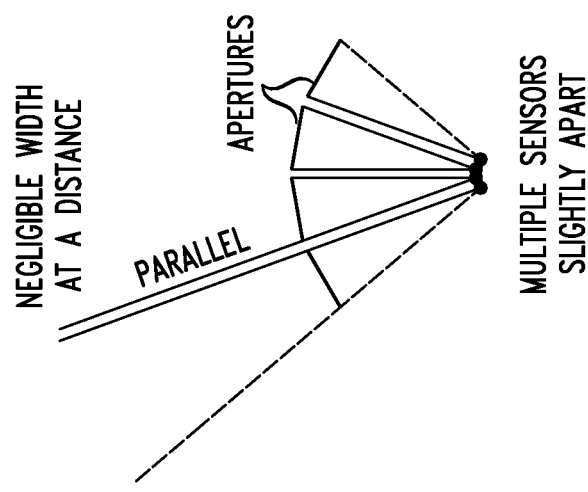

FIG. 3B depicts a realistic configuration in which multiple separated apertures direct light onto multiple sensors which are all located slightly apart from each other. Here, each set of aperture and sensor may be moved in parallel without rotation and the width between the apertures and the sensors is negligible at a distance.

Figure 3C:
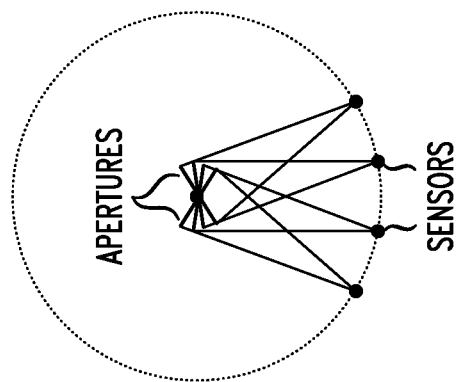

FIG. 3C depicts a configuration in which multiple overlapping apertures direct light onto multiple sensors which are all located farther apart from each other. The apertures are made to overlap since each set of sensor and aperture is translated such that the multiple sensors are located on the circumference of a circle. The lines drawn from each of the sensors toward the respective apertures illustrate a field of view passing through the respective apertures and, thus, illustrate that apertures need to be rotated around the origin in order to ensure that light passing through the apertures is incident on the sensors, respectively. It may be seen that, the farther apart the sensors are moved, the greater the amount of rotation of the associated apertures that is required in order to ensure that light passing through the apertures is incident on the sensors, respectively.

Figure 3D:
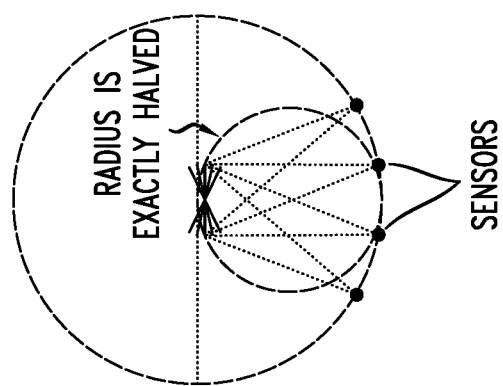

FIG. 3D depicts a configuration in which the multiple overlapping apertures are replaced by a single aperture and the locations of the multiple sensors are adjusted such that light passing through the single aperture is incident on each of the sensors. The sensors are moved from being aligned on a circle whose center is the location of the single aperture to being aligned on a circle having a radius that is substantially half of the radius of the circle whose center is the location of the single aperture. In other words, the circle on which the sensors are arranged also passes substantially through the single aperture.

Figure 3E:
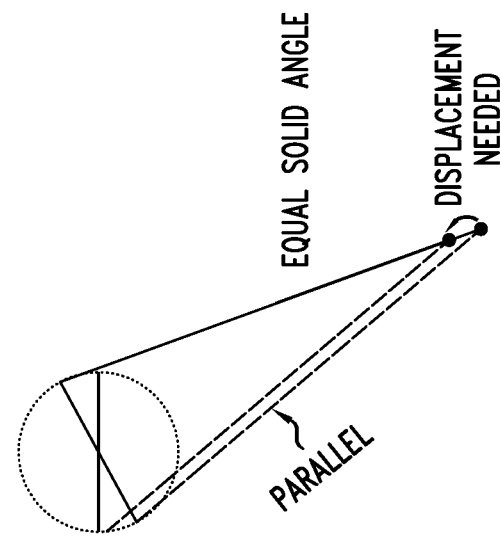

FIG. 3E depicts a detailed view of the relocation of the sensors as illustrated in FIG. 3D. This illustrates the displacement of a sensor from being on the circumference of the original circle to being on the circumference of the halved circle in FIG. 3D. This is accompanied with the displacement of a sensor from being aligned with a line to an edge of an aperture in a multi-aperture arrangement to a line to an edge of the single aperture in a single-aperture arrangement.

Figure 3F:
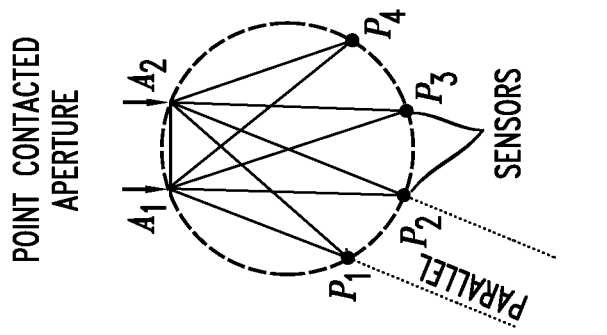

FIG. 3F depicts a configuration in which light passing through the single aperture is incident on multiple sensors. This illustrates the arrangement of the smaller circle of FIG. 3D, in which the locations of the multiple sensors are adjusted such that light passing through the single aperture is incident on each of the sensors. The points at which the edges of the single aperture contact the circle are denoted as points $A_1$ and $A_2$ and the locations of the sensors on the circle are denoted as points $P_1$, $P_2$, $P_3$, and $P_4$. The arc lengths of arcs $A_1A_2$, $P_1P_2$, $P_2P_3$, and $P_3P_4$ are all the same and, similarly, the segment lengths of segments $A_1A_2$, $P_1P_2$, $P_2P_3$, and $P_3P_4$ are all the same. The sensors are arranged such that a set of reference lines, between vertices of the single aperture and the sensors (which are adjacent sensors), are parallel or substantially parallel.

Figure 4:
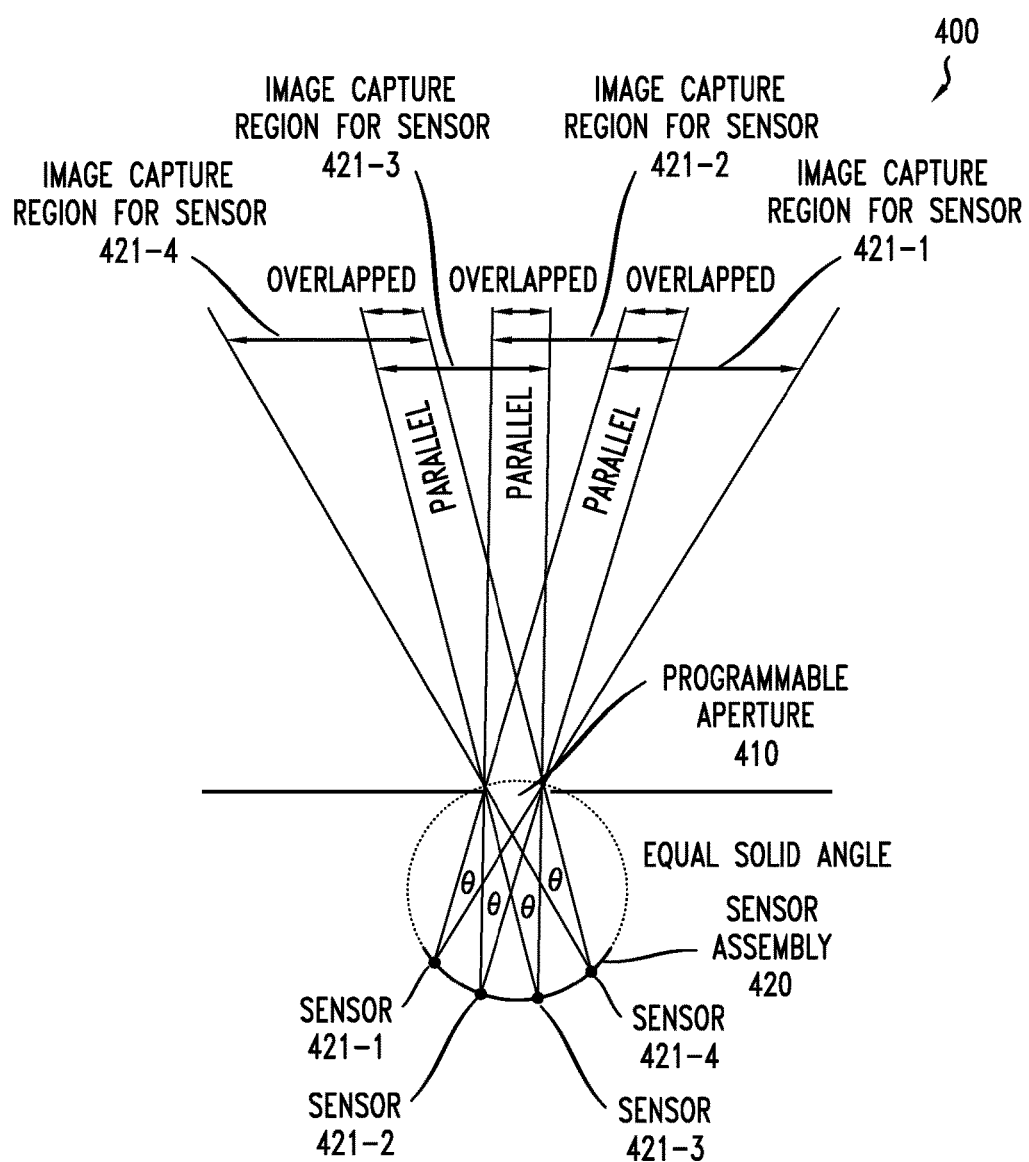
FIG. 4 depicts a detailed cross-sectional view of an exemplary single-aperture multi-sensor lensless camera having a cylindrical or spherical arrangement of sensors.

FIG. 4 depicts a detailed cross-sectional view of an exemplary single-aperture multi-sensor lensless camera having a cylindrical or spherical arrangement of sensors.

The single-aperture multi-sensor lensless camera 400 includes a programmable aperture 410 and a sensor assembly 420 including a set of sensors 421 (illustratively, sensors 421-1, 421-2, 421-3, and 421-4). The view of the single-aperture multi-sensor lensless camera 400 may be considered to be a top view in a cylindrical case (as further illustrated in FIG. 5A) or a side view in a spherical case (as further illustrated in FIG. 6B), such that the programmable aperture 410 appears as a line (as opposed to a square or other shape). The sensors 421 of sensor assembly 420 are arranged on the concave surface of a cylinder or sphere where the programmable aperture 410 is point contacted to the sphere. The sensors 421 of the sensor assembly 420 are equally distributed on the surface of the cylinder or sphere. As depicted in FIG. 4, the view angles of the sensors 421 of sensor assembly 420, where the respective view angle of a respective sensor 421 is the angle between a first line from the sensor 421 to a first edge of the programmable aperture 410 and a second line from the sensor 421 to a second (opposing) edge of the programmable aperture 410, are equal (denoted by θ).

As depicted in FIG. 4, the sensors 421 of the sensor assembly 420 are arranged such that a set of reference lines, between vertices of the programmable aperture 410 and the sensors 421 (which are adjacent sensors), are parallel or substantially parallel.

As further depicted in FIG. 4, the respective view angle (again, denoted by θ) of a respective sensor 421 represents an image capture region of the respective sensor 421 (i.e., representing a portion of the image that is captured by the respective sensor 421). The arrangement of sensors 421 is such that adjacent sensors 421 have overlapping image capture regions such that the entire image may be stitched together using the respective image capture regions of the sensors 421. It is noted that the parallel lines of adjacent sensors 421 define the overlapping portions of the image capture regions of the adjacent sensors 421 and that the overlapping portions are negligible compared to the view of each sensor 421 at a long distance (e.g., approaching or reaching a 0 solid angle of overlap at infinity).

It will be appreciated that the foregoing example is merely one of many potential implementations of the single-aperture multi-sensor lensless camera and that various other implementations of the single-aperture multi-sensor lensless camera may be realized (e.g., using fewer or more sensors, using a different aperture to sensor distance, recovering different sized images, or the like, as well as various combinations thereof.

FIGS. 5A-5C depict front, side and top views of an exemplary single-aperture multi-sensor lensless camera having a cylindrical arrangement of sensors. The single-aperture multi-sensor lensless camera 500 includes a programmable aperture 510 and a sensor assembly including a set of sixteen sensors 521 arranged in a 4×4 array on the concave surface of a cylinder.

FIG. 5A depicts a front view 501 of the single-aperture multi-sensor lensless camera 500, illustrating a view of a direction in which incident light may pass through portions of the programmable aperture 510.

FIG. 5B depicts a side view 502 of the single-aperture multi-sensor lensless camera 500, such that the programmable aperture 510 appears as a line (as in FIG. 4) and the sensors 521 are arranged on the concave surface of a cylinder (it will be appreciated that only eight sensors are depicted since a view of the other eight sensors is blocked by the eight sensors depicted).

FIG. 5C depicts a top view 503 of the single-aperture multi-sensor lensless camera 500, such that the programmable aperture 510 again appears as a line and the sensors 521 are arranged with equal inter-sensor arc length on the concave surface of a cylinder (it will be appreciated that the three-dimensional cylinder appears to be a circle due to the view being from the top).

FIGS. 6A-6C depict top, side, and bottom views of an exemplary single-aperture multi-sensor lensless camera having a spherical arrangement of sensors. The single-aperture multi-sensor lensless camera 600 includes a programmable aperture 610 and a sensor assembly including a set of sixteen sensors 621 arranged in a 4×4 array on the concave surface of a sphere.

FIG. 6A depicts a top view 601 of the single-aperture multi-sensor lensless camera 600, illustrating a view of a direction in which incident light may pass through portions of the programmable aperture 610.

FIG. 6B depicts a side view 602 of the single-aperture multi-sensor lensless camera 600, such that the programmable aperture 610 appears as a line (as in FIG. 4) and the sensors 621 are arranged on the concave surface of a sphere (it will be appreciated that only eight sensors are depicted since a view of the other eight sensors is blocked by the eight sensors depicted).

FIG. 6C depicts a bottom view 603 of the single-aperture multi-sensor lensless camera 600, such that the programmable aperture 610 is not depicted and the sensors 621 are arranged with equal inter-sensor arc length on the concave surface of a sphere (it will be appreciated that the sphere does not appear to be a three-dimensional sphere due to the view being from the bottom).

The configuration of an exemplary single-aperture multi-sensor lensless camera having a spherical arrangement of sensors (e.g., as in FIGS. 6A-6C) may be further understood with respect to an example. For example, assume that the single-aperture multi-sensor lensless camera will use a square programmable aperture of width (50 mm)*sin(90°/16) and a 16×16 array of sensors (i.e., 256 total sensors) on a sphere of radius 25 mm, and that the depth from the programmable aperture to the sensors is maximally 50 mm. Then the inter-sensor arc length between sensors is $\pi*(25$ mm$)/16$ and the inter-sensor lineal distance between sensors is the same as the aperture width (50 mm)*sin(90°/16). If the single aperture modulates light with 96 independent light modulation patterns, the sensors get a total of 16*16*96=24,576 compressive measurements. If one will recover a 256× 256 (or 512×512) pixels image, the compression ratio is 37.5% (or 9.375%). The view angle is approximately 90°. It is noted that, as the radius increases with a fixed aperture, the view angle decreases.

Figure 7C:
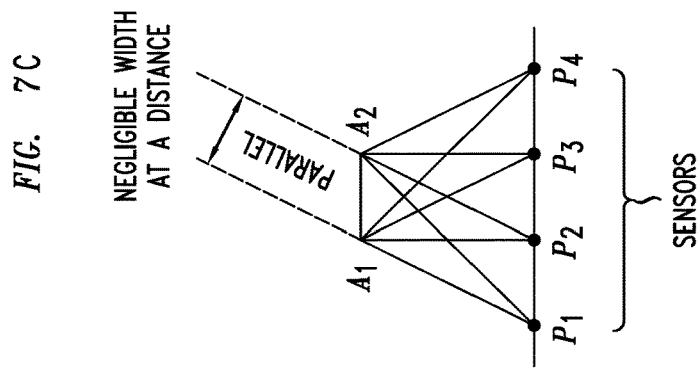
FIGS. 7A-7C depict two-dimensional (2D) cross sectional views of an exemplary single-aperture multi-sensor lensless camera having a planar arrangement of sensors.
Figure 7B:
Figure 7A:
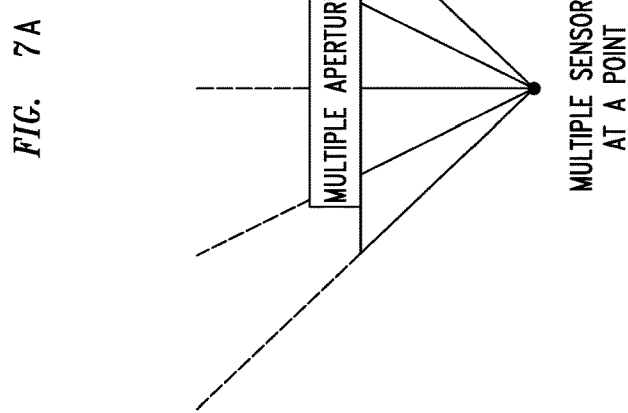

FIGS. 7A-7C depict two-dimensional (2D) cross sectional views of an exemplary single-aperture multi-sensor lensless camera having a planar arrangement of sensors. FIGS. 3A-3F illustrate transformation of independent use of multiple apertures and multiple sensors into a single-aperture multi-sensor lensless camera.

It will be appreciated that the transformation of FIGS. 7A-7C does not require the fine-tuning of FIGS. 3D-3F and, thus, that a portion of the steps of the transformation have been omitted.

FIG. 7A depicts a desired configuration in which multiple separated apertures direct light onto multiple sensors which are all located at a single point. This represents the independent use of multiple apertures and multiple sensors. By running aperture patterns independently and letting sensors sense each view, this desired configuration can take measurements quickly. However, while such an arrangement of apertures and sensors is desirable, this arrangement of apertures and sensors is not realistic since multiple sensors cannot physically occupy the same location.

FIG. 7B depicts a realistic configuration in which multiple separated apertures direct light onto multiple sensors which are all located slightly apart from each other. Here, each set of aperture and sensor may be moved in parallel without rotation and the width between the apertures and the sensors is negligible at a long distance (e.g., approaching or reaching a 0 degree solid angle of overlap at infinity).

FIG. 7C depicts a configuration in which light from a single aperture is incident on multiple sensors. This illustrates the arrangement of a planar arrangement of sensors in which the locations of the multiple sensors are adjusted such that light passing through the single aperture is incident on each of the sensors. The points at the edges of the single aperture are denoted as points $A_1$ and $A_2$ and the locations of the sensors on the plane are denoted as points $P_1$, $P_2$, $P_3$, and $P_4$. The segment lengths of segments $A_1A_2$, $P_1P_2$, $P_2P_3$, and $P_3P_4$ are all the same (which may be denoted as equal inter-sensor lineal lengths or distances for $P_1P_2$, $P_2P_3$, and $P_3P_4$). The sensors are arranged such that a set of reference lines, between vertices of the single aperture and the sensors (which are adjacent sensors), are parallel or substantially parallel. It will be appreciated that, although FIGS. 7A-7C are primarily presented as being two-dimensional cross sectional views of an exemplary single-aperture multi-sensor lensless camera having a planar arrangement of sensors, FIGS. 7A-7C also may be considered to be two-dimensional longitudinal sectional views of an exemplary single-aperture multi-sensor lensless camera having a cylindrical arrangement of sensors (i.e., the transformation for a cylindrical arrangement of sensors may be based on FIGS. 3A-3F as discussed above or based on FIGS. 7A-7C).

Figure 8:
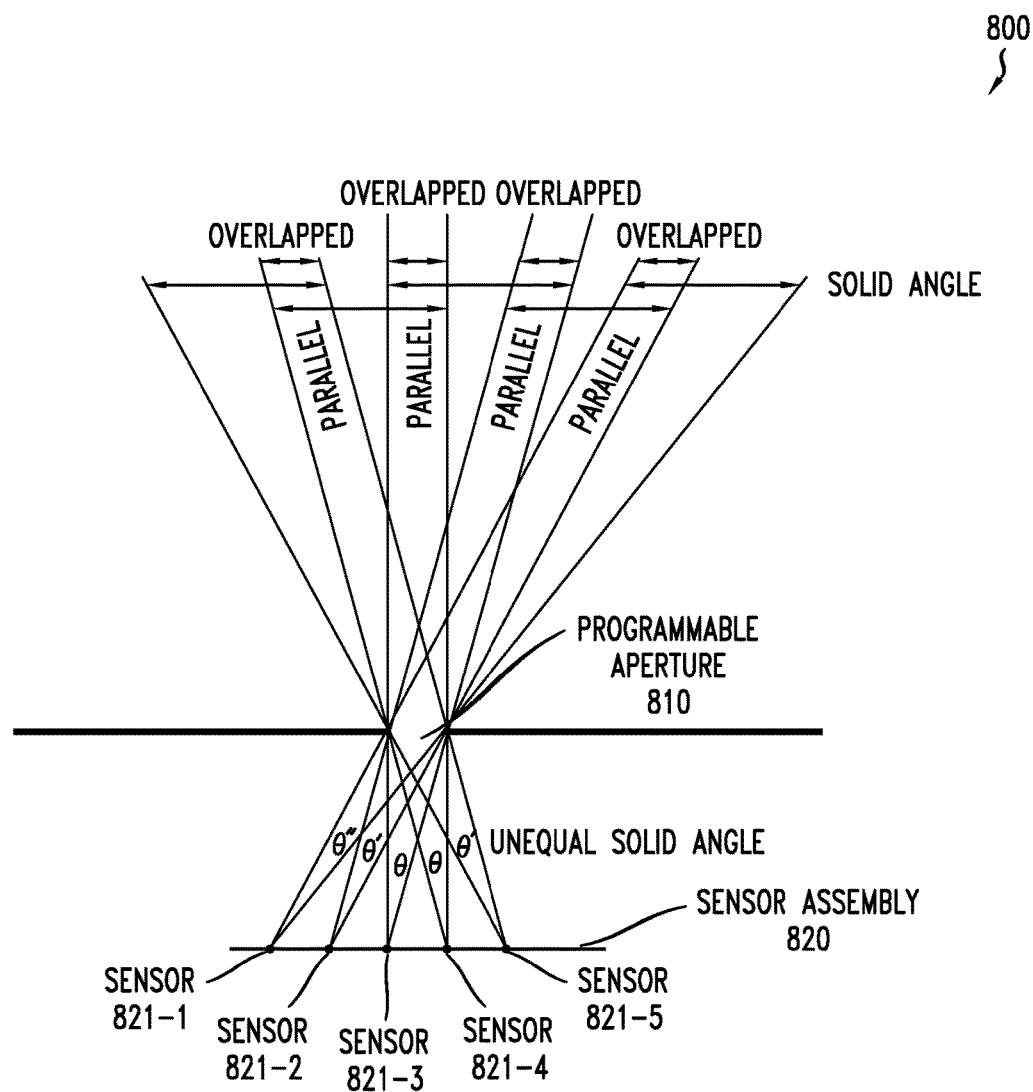
FIG. 8 depicts a detailed cross-sectional view of an exemplary single-aperture multi-sensor lensless camera having a planar arrangement of sensors.

FIG. 8 depicts a detailed cross-sectional view of an exemplary single-aperture multi-sensor lensless camera having a planar arrangement of sensors.

The single-aperture multi-sensor lensless camera 800 includes a programmable aperture 810 and a sensor assembly 820 including a set of sensors 821 (illustratively, sensors

821-1, 821-2, 821-3, 821-4, and 821-5). The view of the single-aperture multi-sensor lensless camera 800 is a side view such that the programmable aperture 810 appears as a line (as opposed to a square, rectangle, or other type of opening). The sensors 821 of sensor assembly 820 are arranged on a line. The sensors 821 of the sensor assembly 820 are equally distributed on the line.

As depicted in FIG. 8, the view angles of the sensors 821 of sensor assembly 820, where the respective view angle of a respective sensor 821 is the angle between a first line from the sensor 821 to a first edge of the programmable aperture 810 and a second line from the sensor 821 to a second (opposing) edge of the programmable aperture 810, are not uniform. The view angle of sensor 821-1 is denoted as θ", the view angle of sensor 821-2 is denoted as θ', the view angle of sensor 821-3 is denoted as θ, the view angle of sensor 821-4 is denoted as θ, and the view angle of sensor 821-5 is denoted as θ'.

As depicted in FIG. 8, the sensors 821 of the sensor assembly 820 are arranged such that a set of reference lines, between vertices of the programmable aperture 810 and the sensors 821 (which are adjacent sensors), are parallel or substantially parallel.

As further depicted in FIG. 8, the respective view angle of a respective sensor 821 represents an image capture region of the respective sensor 821 (i.e., representing a portion of the image that is captured by the respective sensor 821). The arrangement of sensors 821 is such that adjacent sensors 821 have overlapping image capture regions such that the entire image may be stitched together using the respective image capture regions of the sensors 821. It is noted that the parallel lines of adjacent sensors 821 represent the overlapping portions of the image capture regions of the adjacent sensors 821 and that the overlapping portions are negligible compared to the view of each sensor 821 at a long distance (e.g., approaching or reaching a 0 degree solid angle of overlap at infinity).

It will be appreciated that, although FIG. 8 is primarily presented as being a cross-sectional view of an exemplary single-aperture multi-sensor lensless camera having a planar arrangement of sensors, FIG. 8 also may be considered to be a longitudinal sectional view of an exemplary single-aperture multi-sensor lensless camera having a cylindrical arrangement of sensors. FIGS. 9A-9C depict top, side, and bottom views of an exemplary single-aperture multi-sensor lensless camera having a planar arrangement of sensors. The single-aperture multi-sensor lensless camera 900 includes a programmable aperture 910 and a sensor assembly including a set of sixteen sensors 921 arranged in a 4×4 array on a planar surface.

FIG. 9A depicts a top view 901 of the single-aperture multi-sensor lensless camera 900, illustrating a view of a direction in which incident light may pass through portions of the programmable aperture 910.

FIG. 9B depicts a side view 902 of the single-aperture multi-sensor lensless camera 900, such that the programmable aperture 910 appears as a line (as in FIG. 8) and the sensors 921 are arranged on the planar surface (it will be appreciated that only four sensors are depicted since a view of the other twelve sensors is blocked by the four sensors depicted).

FIG. 9C depicts a bottom view 903 of the single-aperture multi-sensor lensless camera 900, such that the programmable aperture 910 is not depicted and the sensors 921 are arranged on the planar surface.

The configuration of an exemplary single-aperture multi-sensor lensless camera having a planar arrangement of sensors may be further understood with respect to an example. For example, assume that the single-aperture multi-sensor lensless camera will use a square programmable aperture and a 16×16 array of sensors on a 50 mm×50 mm sized square (i.e., 256 total sensors), and that the depth from the programmable aperture to the sensors is 25 mm. Then the inter-sensor distance between sensors is 50 mm/16=3.1250 mm, and the width of the square programmable aperture is the same as 3.1250 mm. If the single aperture modulates light with 96 independent light modulation patterns, the sensors get a total of 16*16*96=24,576 compressive measurements. If one will recover a 256×256 (or 512×512) pixels image, the compression ratio is 37.5% (or 9.375%). The view angle is approximately 180°−2* $(180°/\pi)*\tan^{-1}(25 \text{ mm}/(50 \text{ mm}/2))=90°$. As the depth increases, the view angle decreases.

Figure 10:
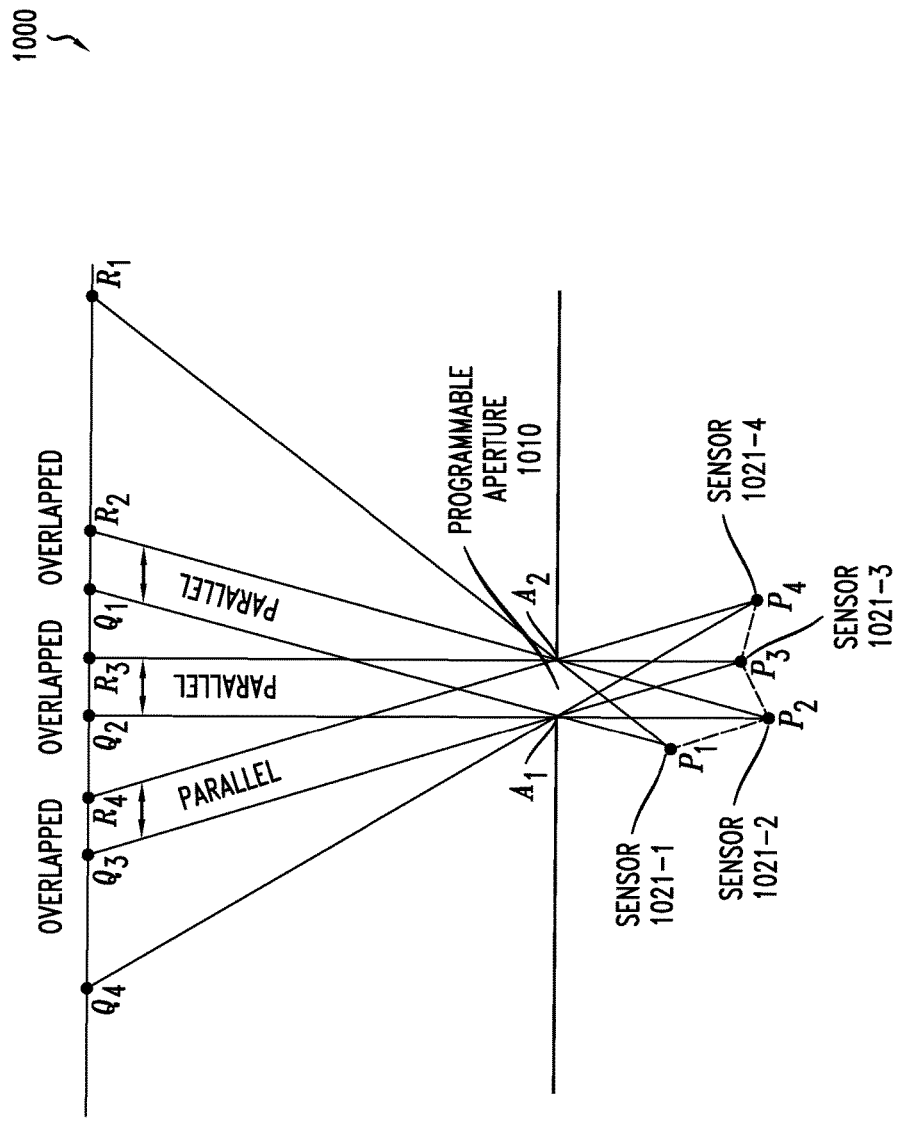
FIG. 10 depicts a sectional view of an exemplary single-aperture multi-sensor lensless camera having a non-uniform arrangement of sensors.

FIG. 10 depicts a sectional view of an exemplary single-aperture multi-sensor lensless camera having a non-uniform arrangement of sensors.

It is noted that the arrangement of the single-aperture multi-sensor lensless camera 1000 may represents a more general embodiment, illustrating that parallelism or substantial parallelism of the programmable aperture vertices still may be realized for non-uniform arrangements of sensors (e.g., without requiring the sensors to be arranged on a cylindrical, spherical, or planar surface).

The single-aperture multi-sensor lensless camera 1000 includes a programmable aperture 1010 and a sensor assembly 1020 including a set of sensors 1021 (illustratively, sensors 1021-1, 1021-2, 1021-3, and 1021-4). The sensors 1021 of sensor assembly 1020 are arranged in a non-uniform manner while still being arranged such that, for adjacent pairs of the sensors 1021, the two sensors 1021 of the adjacent pair of sensors 1021 are arranged such that a set of reference lines, between vertices of the programmable aperture 1010 and the sensors 1021 (which are adjacent sensors), are parallel or substantially parallel.

As further depicted in FIG. 10, the respective view angle of a respective sensor 1021 represents an image capture region of the respective sensor 1021 (i.e., representing a portion of the image that is captured by the respective sensor 1021). The arrangement of sensors 1021 is such that adjacent sensors 1021 have overlapping image capture regions such that the entire image may be stitched together using the respective image capture regions of the sensors 1021. It is noted that the parallel lines of adjacent sensors 1021 define the overlapping portions of the image capture regions of the adjacent sensors 1021 and that the overlapping portions are negligible compared to the view of each sensor 1021 at a long distance (e.g., approaching or reaching a 0 solid angle of overlap at infinity).

As further depicted in FIG. 10, the sensors 1021 are arranged such that various conditions associated with arrangement of sensors in uniform arrangements (e.g., where the sensors are arranged on a cylindrical, spherical, or planar surface) may be relaxed, without relaxing the parallelism or substantial parallelism of the programmable aperture vertices, such that the non-uniform arrangement of sensors 1021 may be utilized. In FIG. 10, the following points and locations are marked: (1) the points at the edges of the single aperture are denoted as points $A_1$ and $A_2$, (2) the locations of the sensors 1021-1, 1021-2, 1021-3, and 1021-4 are denoted as points $P_1, P_2, P_3,$ and $P_4$, respectively, and (3) the image capture regions of the sensors 1021-1, 1021-2, 1021-3, and 1021-4 are indicated by line segments $Q_1R_1$ (with $Q_1$ being an image capture point associated with a line between $P_1$ and $A_1$ and with $R_1$ being an image capture point associated with a line between $P_1$ and $A_2$), $Q_2R_2$ (with $Q_2$ being an image capture point associated with a line between $P_2$ and $A_1$ and with $R_2$ being an image capture point associated with a line between $P_2$ and $A_2$), $Q_3R_3$ (with $Q_3$ being an image capture point associated with a line between $P_3$ and $A_1$ and with $R_3$ being an image capture point associated with a line between $P_3$ and $A_2$), and $Q_4R_4$ (with $Q_4$ being an image capture point associated with a line between $P_4$ and $A_1$ and with $R_4$ being an image capture point associated with a line between $P_4$ and $A_2$), respectively. For example, the non-uniform arrangement of sensors 1021 may include an arrangement of sensors 1021 in which the segment lengths $P_1P_2$, $P_2P_3$, and $P_3P_4$ do not need to be equal (and, in fact, could all be different). For example, the non-uniform arrangement of sensors 1021 may include an arrangement of sensors 1021 such that the segment lengths of the image capture regions $Q_1R_1$, $Q_2R_2$, $Q_3R_3$, and $Q_4R_4$ do not need to be equal (and, in fact, could all be different). For example, the non-uniform arrangement of sensors 1021 may include an arrangement of sensors 1021 such that the angles $Q_1P_1R_1$, $Q_2P_2R_2$, $Q_3P_3R_3$, and $Q_4P_4R_4$ do not need to be equal (and, in fact, could all be different).

It will be appreciated that the non-uniform arrangement of sensors 1021 is merely an example, and that various other non-uniform arrangements of sensors 1021 may be used while still realizing parallelism or substantial parallelism of the programmable aperture vertices.

Figure 11:
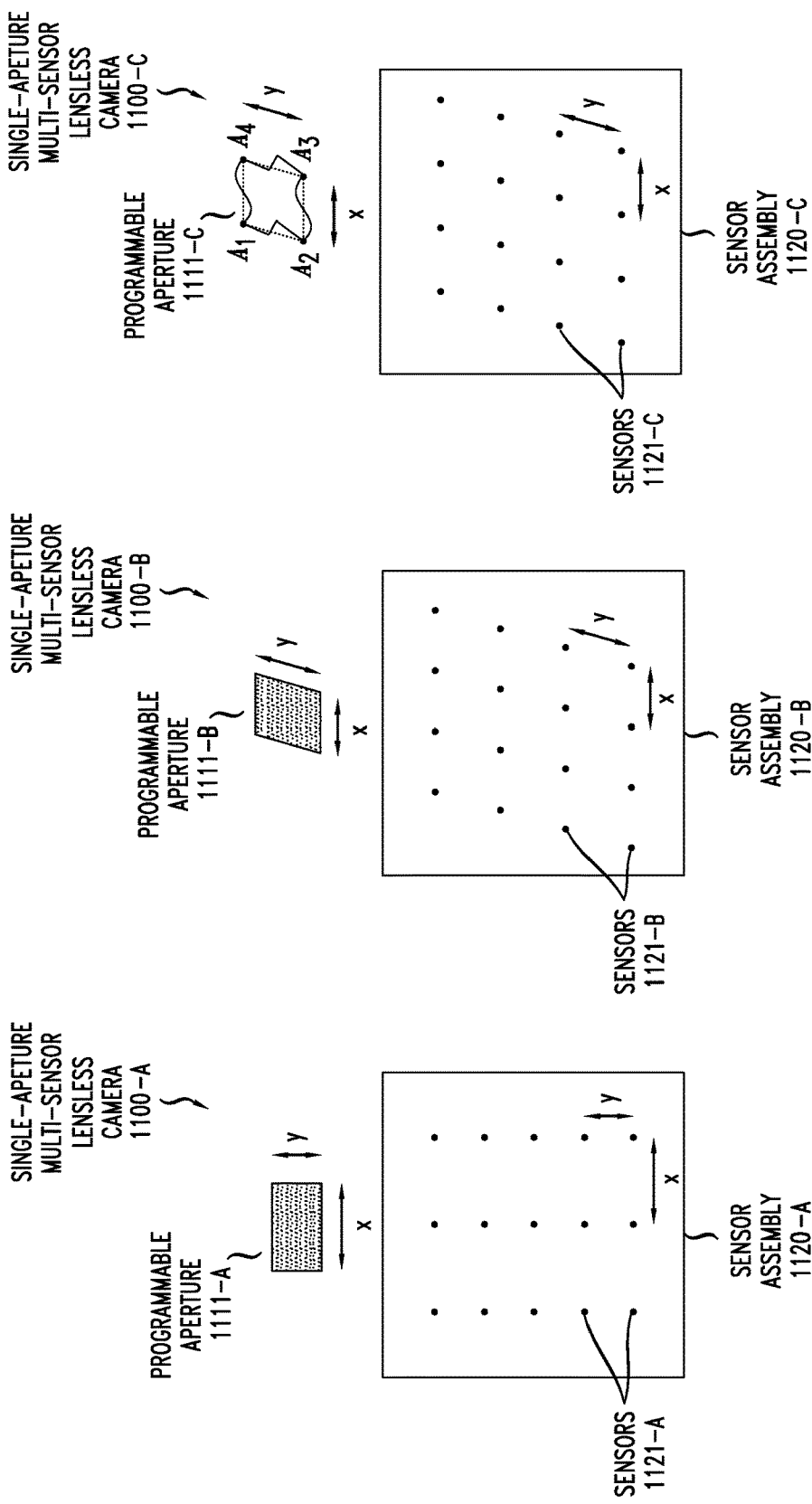
FIGS. 11A-11C depict exemplary single-aperture multi-sensor lensless cameras having a planar arrangement of sensors for illustrating correlation between aperture characteristics and sensor arrangement.

FIGS. 11A-11C depict exemplary single-aperture multi-sensor lensless cameras having a planar arrangement of sensors for illustrating correlation between aperture characteristics and sensor arrangement.

FIG. 11A depicts an exemplary single-aperture multi-sensor lensless camera 1100-A that includes a programmable aperture 1111-A and a sensor assembly 1120-A including a set of sensors 1121-A. The programmable aperture 1111-A has a rectangular shape and, similarly, the sensors 1121-A are arranged in a repeating pattern of rectangular shapes for adjacent sets of sensors 1121-A (illustratively, the length (x) and width (y) of the programmable aperture 1111-A are equal to the lineal inter-sensor distances between corresponding pairs of sensors 1121-A in the repeating pattern of rectangular shapes for adjacent sets of sensors 1121-A).

FIG. 11B depicts an exemplary single-aperture multi-sensor lensless camera 1100-B that includes a programmable aperture 1111-B and a sensor assembly 1120-B including a set of sensors 1121-B. The programmable aperture 1111-B has a parallelogram shape and, similarly, the sensors 1121-B are arranged in a repeating pattern of parallelogram shapes for adjacent sets of sensors 1121-B (illustratively, the length (x) and width (y) of the programmable aperture 1111-B are equal to the lineal inter-sensor distances between corresponding pairs of sensors 1121-B in the repeating pattern of parallelogram shapes for adjacent sets of sensors 1121-B).

FIG. 11C depicts an exemplary single-aperture multi-sensor lensless camera 1100-C that includes a programmable aperture 1111-C and a sensor assembly 1120-C including a set of sensors 1121-C. The programmable aperture 1111-C has a parallelogram-like shape (illustratively, the vertices are arranged such that use of straight-line edges between the vertices would form a true parallelogram; however, the edges between the vertices are not straight lines and, thus, form the so-called parallelogram-like shape). The edges between the vertices may take various forms, e.g., a set of straight lines arranged with respect to each other such that the edge between the vertices is not straight (as illustrated with respect to edges $A_1A_2$ and $A_3A_4$), a curved line (as illustrated with respect to edges $A_1A_4$ and $A_2A_3$), or the like, as well as various combinations thereof (depicted in FIG. 11C). More specifically, in FIG. 11C, the edges between the vertices of the programmable aperture 1111-C are arranged such that the edge $A_1A_2$ is translated to exactly overlap on the edge $A_3A_4$ and such that the edge $A_1A_4$ is translated to exactly overlap on the edge $A_2A_3$. The sensors 1121-C are arranged in a repeating pattern of parallelogram shapes for adjacent sets of sensors 1121-C (illustratively, the length (x) between vertices of the programmable aperture 1111-C and the width (y) between vertices of the programmable aperture 1111-C) are equal to the lineal inter-sensor distances between corresponding pairs of sensors 1121-C in the repeating pattern of parallelogram shapes for adjacent sets of sensors 1121-C). This further illustrates that the arrangement of the sensors 1121-C with respect to each other may be based on the vertices of the programmable aperture 1111-C, even where the programmable aperture 1111-C has an irregular shape (e.g., due to use of non-straight edges between the vertices of the programmable aperture 1111-C).

Figure 12:
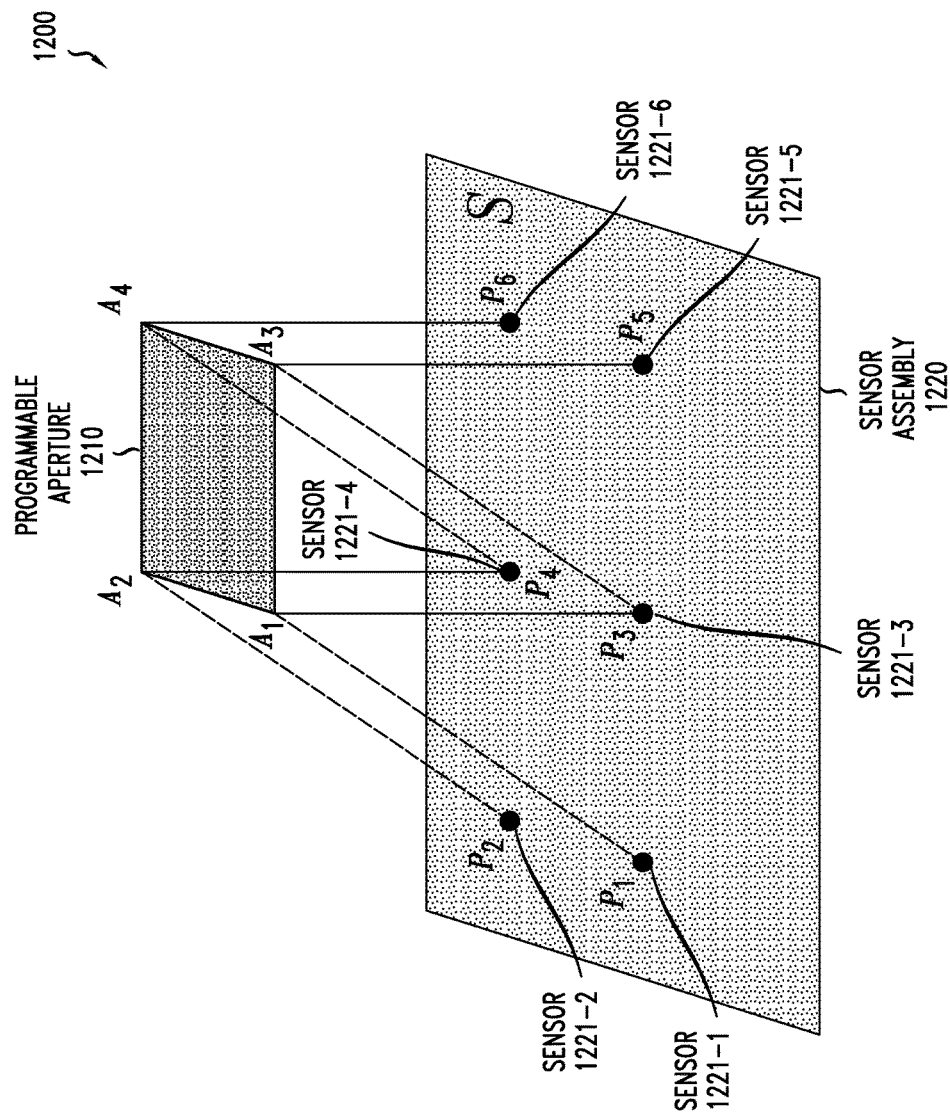
FIG. 12 depicts an exemplary single-aperture multi-sensor lensless camera having an arrangement of sensors for illustrating parallelism of adjacent sensors.

FIG. 12 depicts an exemplary single-aperture multi-sensor lensless camera having an arrangement of sensors for illustrating parallelism of adjacent sensors.

The single-aperture multi-sensor lensless camera 1200 includes a programmable aperture 1210 and a sensor assembly 1220 including a set of sensors 1221 (illustratively, sensors 1221-1, 1221-2, 1221-3, 1221-4, 1221-5, and 1221-6).

The programmable aperture 1210 is defined by four vertices (which are denoted by $A_1$, $A_2$, $A_3$, and $A_4$). It is noted that pairs of vertices connected by edges of the programmable aperture 1210 are considered to be adjacent vertices (illustratively, $A_1$ and $A_2$ are adjacent, $A_1$ and $A_3$ are adjacent, $A_1$ and $A_4$ are adjacent, $A_2$ and $A_3$ are adjacent, $A_2$ and $A_4$ are adjacent, and $A_3$ and $A_4$ are adjacent).

The sensor assembly 1220, as noted above, includes six sensors 1221. The sensors 1221 are indicated as being at respective points on a surface (which are denoted by $P_1$, $P_2$, $P_3$, $P_4$, $P_5$, and $P_6$ for sensors 1221-1, 1221-2, 1221-3, 1221-4, 1221-5, and 1221-6, respectively). It is noted that neighboring sensors 1221 are considered to be adjacent sensors 1221 (illustratively, sensors 1221-1, 1221-2, 1221-3, and 1221-4 at respective points $P_1$, $P_2$, $P_3$, and $P_4$ are adjacent and sensors 1221-3, 1221-4, 1221-5, and 1221-6 at respective points $P_3$, $P_4$, $P_5$, and $P_6$ are adjacent; however, the sensors 1221-1 and 1221-2 at respective points $P_1$ and $P_2$ and the sensors 1221-5 and 1221-6 at respective points $P_5$ and $P_6$ are not adjacent to each other).

The programmable aperture 1210 and sensors 1221 may be arranged to provide parallelism or substantial parallelism as discussed herein. For example, one or more sets of adjacent sensors 1221 may be arranged such that respective reference lines, between respective vertices of the programmable aperture 1210 and the respective adjacent sensors 1221 of the set of adjacent sensors 1221, are parallel or substantially parallel. For example, reference lines between the adjacent sensors 1221-1, 1221-2, 1221-3, and 1221-4 at the respective points $P_1$, $P_2$, $P_3$, and $P_4$ and the four respective vertices $A_1$, $A_2$, $A_3$, and $A_4$ of the programmable aperture 1210 are parallel (as indicated by the four dashed parallel lines). Similarly, for example, lines from the adjacent sensors 1221-3, 1221-4, 1221-5, and 1221-6 at the respective points $P_3$, $P_4$, $P_5$, and $P_6$ to the four respective vertices $A_1$, $A_2$, $A_3$, and $A_4$ of the programmable aperture 1210 are parallel (as indicated by the four solid parallel lines).

The arrangement of the programmable aperture 1210 and the sensors 1221 to support parallelism as described above may be provided in various ways. For example, the positions $P_1$, $P_2$, $P_3$, and $P_4$ of adjacent sensors 1221-1, 1221-2, 1221-3, and 1221-4 on surface S may first be determined by projecting from the four respective vertices $A_1$, $A_2$, $A_3$, and $A_4$ of the programmable aperture 1210 toward the surface S in parallel (or using substantially parallel reference projections). The positions $P_5$ and $P_6$ of sensors 1221-5 and 1221-6 on the surface S will then be dictated by the positions of $P_3$ and $P_4$ of sensors 1221-3 and 1221-4 on surface S as these are the sensors 1221 that are to be adjacent to sensors 1221-5 and 1221-6. For example, the positions $P_5$ and $P_6$ of sensors 1221-5 and 1221-6 on the surface S may be determined by projecting from the four respective vertices $A_1$, $A_2$, $A_3$, and $A_4$ of the programmable aperture 1210 toward the surface S in parallel (or using substantially parallel reference projections) based on the existing reference projections from vertices $A_1$ and $A_2$ to the positions of $P_3$ and $P_4$ of sensors 1221-3 and 1221-4 on surface S, thereby resulting in positions $P_3$, $P_4$, $P_5$, and $P_6$ of adjacent sensors 1221-3, 1221-4, 1221-5, and 1221-6 on surface S such that reference lines from the four respective vertices $A_1$, $A_2$, $A_3$, and $A_4$ of the programmable aperture 1210 toward adjacent sensors 1221-3, 1221-4, 1221-5, and 1221-6 on surface S are parallel or substantially parallel. It will be appreciated that additional sensors (omitted for purposes of clarity) could then be point contacted to the surface S (in various directions relative to the existing sensors 1221 that have already been point contacted to the surface S) based on parallelism of the vertices with respect to combinations of the existing sensors 1221 and the additional sensors. It will be appreciated that the point contacting of the sensors 1221 to the surface S may be supported for various types of surfaces (e.g., cylindrical, spherical, planar, or the like) by simply following the reference lines from the vertices of the programmable aperture 1210 toward the surface S to achieve the level of parallelism (e.g., fully parallel or substantially parallel) desired or required.

It is noted that, although primarily presented herein with respect to embodiments in which the parallelism is ideal parallelism (fully parallel), in at least some embodiments the parallelism may be near-parallelism (which also may be referred to as being substantially parallel). As discussed above, the level of parallelism may be based on or controlled by inter-sensor distances between the sensors of the single-aperture multi-sensor lensless camera. If the view angle of a sensor is $\theta$, the absolute error of parallelism may be defined as $k\theta$. At $k=0$, the parallelism is ideal parallelism. In at least some embodiments, it may be required or desired to break ideal parallelism (e.g., by arranging sensors such that the inter-sensor distance is larger than in the case of ideal parallelism or by arranging sensors such that the inter-sensor distance is smaller than in the case of ideal parallelism). As the value of k increases from 0, ideal parallelism is broken and the level of parallelism that is achieved decreases. It is noted that the determination of the value of k may depend on various factors, such as a distance of the object from the single-aperture multi-sensor lensless camera, one or more design constraints or considerations associated with the design of the single-aperture multi-sensor lensless camera, one or more characteristics of image reconstruction processing (e.g., image quality desired or required, computing resource available, or the like), one or more characteristics of the image to be captured, or the like, as well as various combinations thereof.

In at least some embodiments, substantial parallelism may be achieved by arranging the sensors such that the inter-sensor distance is smaller than in the case of ideal parallelism. This will result in a larger amount of overlap of the views of adjacent sensors, which may be handled by image reconstruction processes configured to handle the additional overlap of the views of adjacent sensors. The amount of change from ideal parallelism (and, thus, the amount of increase in inter-sensor distance and the amount of additional overlap of the views of adjacent sensors) may be any suitable amount (e.g., a change of 1 degree, a change of 2 degrees, a change of 5 degrees, or the like). It will be appreciated that the amount of change from ideal parallelism (and, thus, the amount of increase in inter-sensor distance and the amount of additional overlap of the views of adjacent sensors) may be designed or handled based on the various factors discussed above for determining the value of k.

In at least some embodiments, substantial parallelism may be achieved by arranging the sensors such that the inter-sensor distance is larger than in the case of ideal parallelism. This may result in gaps between the views of adjacent sensors (thereby resulting in information loss). The presence or absence of gaps in this arrangement may depend on the distance of the object or scene from the camera. This may be useful, for example, when the single-aperture multi-sensor lensless camera is placed to capture an image of an object at a short distance or is capturing an image of an object at a short distance. If the object or scene is relatively close to the camera, there may not be any gaps for light coming from the scene or object. On the other hand, if the object or scene is relatively far from the camera, there may be gaps for light coming from the scene or object. It is noted that while such loss of information is generally avoided in most cases, it may be required or desired in certain cases (e.g., when design considerations and/or desired or required image capture goals might make gaps in the image required, tolerable, or even desirable). The amount of change from ideal parallelism (and, thus, the amount of decrease in inter-sensor distance and the sizes of the gaps between the views of adjacent sensors) may be any suitable amount (e.g., a change of 1 degree, a change of 2 degrees, a change of 5 degrees, or the like). It will be appreciated that the amount of change from ideal parallelism (and, thus, the amount of decrease in inter-sensor distance and the sizes of the gaps between the views of adjacent sensors) may be designed or handled based on the various factors discussed above for determining the value of k.

Figure 13:
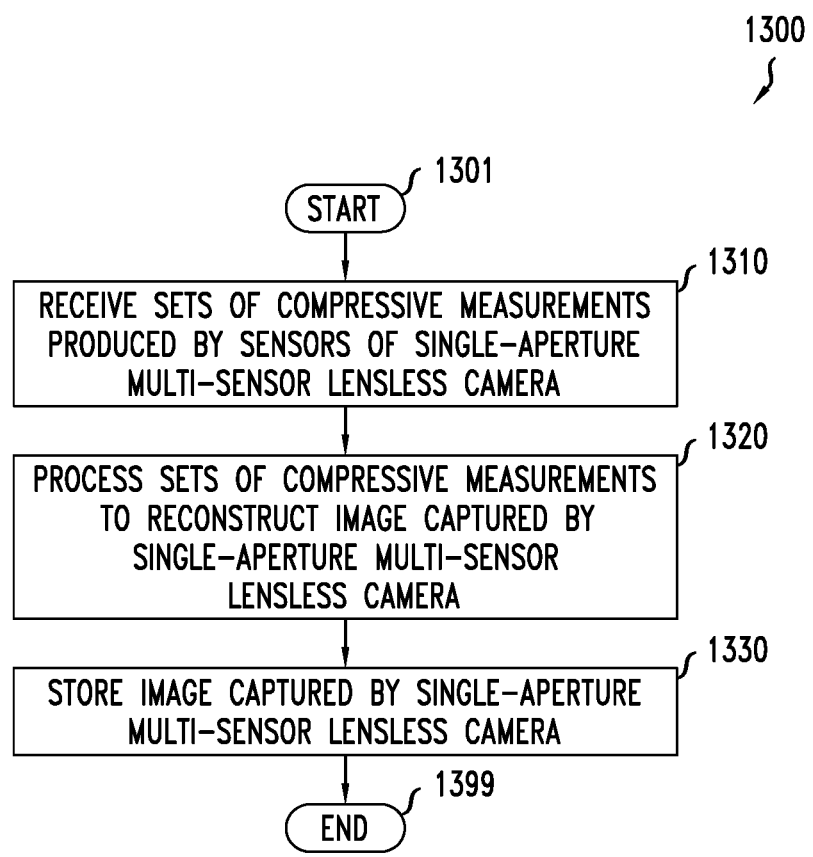
FIG. 13 depicts an exemplary embodiment of a method for reconstructing an image captured by a single-aperture multi-sensor lensless camera.

FIG. 13 depicts an exemplary embodiment of a method for reconstructing an image captured by a single-aperture multi-sensor lensless camera. The method 1300 of FIG. 13 may be performed by a computing element which may be local to the single-aperture multi-sensor lensless camera (e.g., a processor of a single-aperture multi-sensor lensless compressive image acquisition system including the single-aperture multi-sensor lensless camera) or which may be remote from the single-aperture multi-sensor lensless camera (e.g., a remote computing element, such as where the compressive measurements produced by the single-aperture multi-sensor lensless camera may be transmitted by the single-aperture multi-sensor lensless camera to the remote computing element for processing). It will be appreciated that, although primarily presented as being performed serially, at least a portion of the functions of method 1300 of FIG. 13 may be performed contemporaneously or in a different order than as presented in FIG. 13.

At block 1301, method 1300 begins.

At block 1310, sets of compressive measurements are received. The sets of compressive measurements are sets of compressive measurements produced by sensors of the single-aperture multi-sensor lensless camera. The sets of compressive measurements each include one or more compressive measurements produced by the respective sensors of the single-aperture multi-sensor lensless camera based on light modulation pattern information used for controlling the light capture patterns of the programmable aperture of the single-aperture multi-sensor lensless camera.

At block 1320, the sets of compressive measurements of the respective sensors of the single-aperture multi-sensor lensless camera are processed to reconstruct an image captured by the single-aperture multi-sensor lensless camera. In at least some embodiments, the image may be reconstructed by processing the sets of compressive measurements of the sensors in combination. In at least some embodiments, the image may be reconstructed by processing the sets of compressive measurements of the respective sensors to reconstruct respective image portions associated with the sensors and processing the respective image portions associated with the sensors to reconstruct the image (e.g., stitching or otherwise combining the image portions to obtain the image). The sets of compressive measurements of the respective sensors of the single-aperture multi-sensor lensless camera may be processed (together or individually as discussed above) using a sparsity-based processing or other type of processing suitable for producing image data (e.g., a full image or image portions) from compressive measurements.

At block 1330, the image captured by the single-aperture multi-sensor lensless camera may be stored. The image also may be handled in other ways. For example, the image may be presented via a presentation interface associated with the single-aperture multi-sensor lensless camera (e.g., via a display of a smartphone in which the single-aperture multi-sensor lensless camera is disposed, via a display of a tablet associated with the single-aperture multi-sensor lensless camera, or the like). For example, the image may be transmitted via one or more communication paths (e.g., for storage and/or presentation at one or more remote devices). The image may be handled in various other ways in which images typically may be handled.

At block 1399, method 1300 ends.

It will be appreciated that, although primarily presented with respect to embodiments in which the single aperture is implemented as a device that controls passage of light through the single aperture (e.g., transparent LCD, transparent LCoS, or the like), in at least some embodiments the aperture may simply be an opening and a separate light control device may be associated with the opening for controlling the passage of light through the opening. For example, the aperture and the light control device (e.g., a programmable mask or other suitable device) may be considered to be separate elements (e.g., the aperture is an opening through which light may pass and the light control device is associated with the aperture for controlling passage of light therethrough). In at least some such embodiments, the light control device may be separately put into the aperture opening without gaps, the light control device may overlay the aperture opening, or the like. It will be appreciated that, in such embodiments, various properties described herein as being properties of the programmable aperture also or alternatively may be considered to be properties of the aperture opening (e.g., shape, vertices, size, or the like, as well as various combinations thereof). It also will be appreciated that, in such embodiments, the vertices of the programmable aperture also may be considered to be vertices of the aperture opening and, thus, that the sensors may be arranged with respect to each other based on the vertices of the aperture opening (e.g., arranged such that respective reference lines, between the respective vertices of the aperture opening and the respective sensors, are parallel or substantially parallel).

It will be appreciated that, although primarily presented herein with respect to embodiments in which the sensors of the single-aperture multi-sensor lensless camera produce compressive measurements for compressive image acquisition, in at least some embodiments the compressive measurements for compressive image acquisition may be produced by one or more devices other than the sensors of the single-aperture multi-sensor lensless camera. For example, where the sensors of a single-aperture multi-sensor lensless camera include photon detectors, the detector output data from the sensors of the block-based lensless camera may be provided to one or more other devices (e.g., which may be disposed within the single-aperture multi-sensor lensless camera, external to but local to the single-aperture multi-sensor lensless camera, external to and remote from the single-aperture multi-sensor lensless camera, or the like, as well as various combinations thereof) configured to produce the compressive measurements based on the detector output data from the sensors of the single-aperture multi-sensor lensless camera (e.g., one or more devices such as one or more A/D converters, one or more processors configured to support A/D conversions functions, or the like, as well as various combinations thereof).

Figure 14:
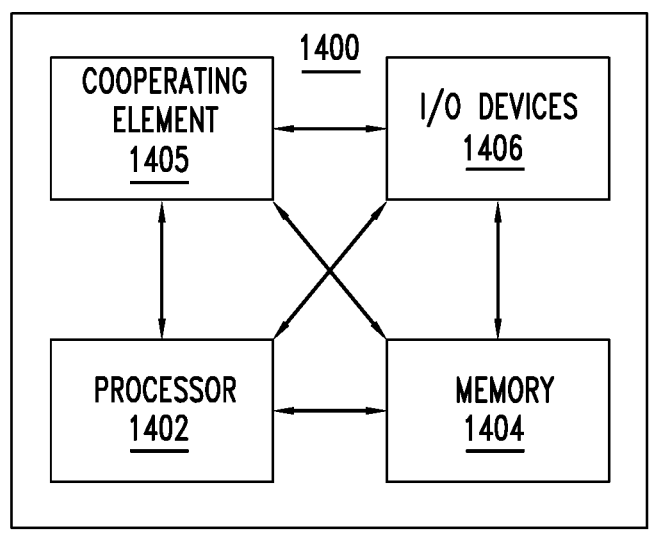
FIG. 14 depicts a high-level block diagram of a computer suitable for use in performing various functions presented herein.

FIG. 14 depicts a high-level block diagram of a computer suitable for use in performing various functions described herein.

The computer 1400 includes a processor 1402 (e.g., a central processing unit (CPU), a processor having a set of processor cores, a processor core of a processor, or the like) and a memory 1404 (e.g., a random access memory (RAM), a read only memory (ROM), or the like). The processor 1402 and the memory 1404 are communicatively connected.

The computer 1400 also may include a cooperating element 1405. The cooperating element 1405 may be a hardware device. The cooperating element 1405 may be a process that can be loaded into the memory 1404 and executed by the processor 1402 to implement functions as discussed herein (in which case, for example, the cooperating element 1405 (including associated data structures) can be stored on a non-transitory computer-readable storage medium, such as a storage device or other storage element (e.g., a magnetic drive, an optical drive, or the like)).

The computer 1400 also may include one or more input/output devices 1406. The input/output devices 1406 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1400 of FIG. 14 may represent a general architecture and functionality suitable for implementing functional elements described herein, portions of functional elements described herein, or the like, as well as various combinations thereof. For example, computer 1400 may provide a general architecture and functionality that is suitable for implementing single-aperture multi-sensor lensless compressive image acquisition system 100, a portion of single-aperture multi-sensor lensless compressive image acquisition system 100, a device including single-aperture multi-sensor lensless compressive image acquisition system 100, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    a programmable aperture configured to modulate passage of light therethrough, the programmable aperture having a shape defined based on a set of vertices; and
    a set of sensors disposed at a distance from the programmable aperture, each of the sensors configured to detect light passing through the programmable aperture;
    wherein the sensors are arranged with respect to each other, based on the vertices of the programmable aperture, such that a first line between a given first sensor of the set of sensors and a first vertex of the set of vertices and a second line between a given second sensor of the set of sensors and a second vertex of the set of vertices are parallel or substantially parallel.

2. The apparatus of claim 1, wherein the programmable aperture is configured to modulate an amount of light permitted to pass therethrough and a pattern of light permitted to pass therethrough.

3. The apparatus of claim 1, wherein the programmable aperture comprises an array of programmable elements configured to be individually controlled to permit light to pass therethrough or to prevent light from passing therethrough.

4. The apparatus of claim 3, wherein the programmable elements are configured to be individually controlled based on light modulation pattern information.

5. The apparatus of claim 1, wherein the shape defined based on the vertices of the programmable aperture is a square, a rectangle, a rhombus, or a parallelogram.

6. The apparatus of claim 1, wherein the programmable aperture comprises a transparent liquid crystal display (LCD) device or a transparent liquid crystal on silicon (LCoS) device.

7. The apparatus of claim 1, wherein the sensors are arranged on a surface.

8. The apparatus of claim 7, wherein the surface comprises a spherical surface, a cylindrical surface, or a planar surface.

9. The apparatus of claim 1, wherein the sensors have a non-uniform arrangement.

10. The apparatus of claim 1, wherein each of the sensors has a respective sensor view associated therewith, wherein overlap between adjacent ones of the sensor views is negligible at a distance.

11. The apparatus of claim 1, wherein, for at least one of the sensors, the at least one sensor comprises a respective photon detector configured to detect light and the at least one sensor is configured to produce a detector output based on the light.

12. The apparatus of claim 1, wherein, for at least one of the sensors, the at least one sensor comprises:
    a photon detector configured to detect light and to produce a detector output based on the light; and
    an analog-to-digital (A/D) converter configured to produce a compressive measurement based on the detector output.

13. The apparatus of claim 1, further comprising:
    a processor and a memory communicatively connected to the processor, the processor configured to:
        receive, from each of the sensors, a detector output produced by the respective sensor;
        process the respective detector outputs to produce respective compressive measurements; and
        store the compressive measurements in the memory.

14. The apparatus of claim 1, further comprising:
    a processor and a memory communicatively connected to the processor, the processor configured to:
        receive, from each of the sensors, a respective compressive measurement produced by the respective sensor; and
        store the compressive measurements in the memory.

15. The apparatus of claim 1, further comprising:
    a processor and a memory communicatively connected to the processor, the processor configured to:
        obtain, for each of the sensors, a respective compressive measurement produced based on the respective sensor; and
        generate, based on processing of the respective compressive measurements, an image.

16. An apparatus, comprising:
    a set of sensors disposed at a distance from a programmable aperture having a shape defined based on a set of vertices and configured to control incidence of light on the sensors, each of the sensors configured to detect light passing through the programmable aperture;
    wherein the sensors are arranged with respect to each other, based on the vertices of the programmable aperture, such that a first line between a given first sensor of the set of sensors and a first vertex of the set of vertices and a second line between a given second sensor of the set of sensors and a second vertex of the set of vertices are parallel or substantially parallel.

17. An apparatus, comprising:
    a programmable aperture configured to modulate passage of light therethrough, the programmable aperture having a shape defined based on a set of vertices;

a set of sensors disposed at a distance from the programmable aperture, each of the sensors configured to detect light passing through the programmable aperture, wherein the sensors are arranged with respect to each other, based on the vertices of the programmable aperture, such that a first line between a given first sensor of the set of sensors and a first vertex of the set of vertices and a second line between a given second sensor of the set of sensors and a second vertex of the set of vertices are parallel or substantially parallel; and
a processor configured to receive image data produced by the sensors and to generate an image based on the image data.

* * * * *